United States Patent [19]

Pippert

[11] 4,425,838
[45] Jan. 17, 1984

[54] FLUID CONTROL DEVICE

[75] Inventor: Aaron J. Pippert, Houston, Tex.

[73] Assignee: Utex Industries, Inc., Houston, Tex.

[21] Appl. No.: 284,009

[22] Filed: Jul. 16, 1981

[51] Int. Cl.³ .............................................. F01B 31/00
[52] U.S. Cl. ........................................ 92/86; 92/168;
                                                        277/24; 277/152
[58] Field of Search ...................... 92/86, 168; 277/24,
                277/59, 152, 153, 207 R, 166, 105, 126, 189

[56] References Cited
U.S. PATENT DOCUMENTS

| | | | |
|---|---|---|---|
| 1,273,738 | 7/1918 | Christenson | 277/207 |
| 2,841,423 | 7/1958 | Moseley | 277/126 |
| 3,035,843 | 5/1962 | Runknagel | 277/126 |
| 3,079,896 | 3/1963 | Johnston | 92/86 |
| 3,659,306 | 5/1972 | Stoltze et al. | 277/24 |
| 4,002,344 | 1/1977 | Smith | 277/189 |
| 4,005,769 | 2/1977 | Itoh | 277/59 |
| 4,055,107 | 10/1977 | Bartley | 92/168 |
| 4,278,260 | 7/1981 | Brown | 277/152 |
| 4,278,261 | 7/1981 | Miura et al. | 277/153 |

FOREIGN PATENT DOCUMENTS 1098306  1/1961  Fed. Rep. of Germany ........ 277/24

Primary Examiner—Robert E. Garrett
Assistant Examiner—Richard S. Meyer
Attorney, Agent, or Firm—Browning, Bushman, Zamecki & Anderson

[57] ABSTRACT

An improved fluid collection device for mounting on cylinder-shaft assemblies, such as stuffing boxes, to control the leakage of fluids. The device comprises a flexible sleeve mounted to the end face of a stuffing box through a radial flange and having an upper cylindrical portion which extends along a length of the shaft reciprocating within the stuffing box. The sleeve includes a first inwardly extending radial portion which wipingly engages the surface of the shaft forming a collar therearound. The wiping collar forms a closed first chamber defined by the inner walls of the sleeve, the surface of the shaft, and the face of the stuffing box adjacent the shaft. Fluid communication is provided between the chamber and a fluid collection reservoir. A second partially closed chamber is similarly formed above the first chamber and is defined by the surface of the shaft, the cylindrical inner sleeve, the open circular end of which is spaced from the shaft, and the inwardly extending radial portion. The first and second chambers are connected to one another by drain apertures and the device itself fixed to end of a stuffing box by a set of universally adaptable clamps. Hydraulic fluid leakage from the stuffing box is collected by the first and second chambers and returned to the fluid reservoir.

16 Claims, 6 Drawing Figures

FLUID CONTROL DEVICE

BACKGROUND OF THE INVENTION

1. Field of the Invention

The invention relates to fluid collection apparatus for cylinder and ram assemblies, and more particularly, to an improved device for preventing leakage of hydraulic fluid from stuffing boxes.

2. History of the Prior Art

Heavy industrial machinery often includes components thereof which incorporate hydraulic piston and cylinder assemblies. Such assemblies utilize relative axial movement between the piston and the cylinder. In particular, high pressure hydraulic cylinder and piston arrangements are common throughout the heavy equipment industry. The use of a hydraulic cylinder and piston, by definition, requires the use of a hydraulic fluid which is a type of oil particularly suited for being placed under very high pressure and transfering forces within a piston-cylinder assembly. This pressurized oil is the medium by which the piston member is urged to reciprocate into and out of an enveloping cylinder member. Axial movement of a piston shaft into and out of one end of a cylinder requires highly reliable seals between the piston rod and the cylinder walls in order to prevent leakage of the highly pressurized hydraulic fluids out of the cylinder and into the environment. In order to minimize fluid leakage from a hydraulic cylinder, stuffing box structures have been implemented which structures include various resilient wipers that act against the surface of the moving piston shaft to form a hopefully leak proof seal.

Resilient members wear during the course of routine reciprocation of the piston into and out of the cylinder, and in practice, all stuffing boxes eventually leak with wear and age. Additionally, operational stresses as well as poor maintenance can produce misalignment between the axis of the cylinder and that of the reciprocating shaft. Shaft misalignment further aggravates wear and results in the misalignment of the seals with the shaft thereby producing leakage and/or seal rupture. Leakage is both an equipment function problem and a pollution problem The principle reason for concern over any leakage of hydraulic fluid from stuffing box is one of safety. The slightest amount of an oily substances such as hydraulic fluid on the floor of a working area constitutes a great hazard, particularly around heavy equipment. A combination of such substances and an unobservant worker can very easily result in slippage and the possibility of a very dangerous fall. Additionally, spilled hydraulic fluid is a fire hazard and requires extra maintenance services to clean up. Hydraulic fluid is also relatively expensive and it is always economically desirable to avoid waste due to leakage of fluid into the environment.

A number of solutions have been proposed to the dilemma of the leakage of fluid from hydraulic equipment and particularly the stuffing box portion of a piston and cylinder combination. The solutions have ranged from a small cap portion covering the stuffing box face and having an end spaced from the shaft, to the addition of a second stuffing box bordering the first in order to double the protection against leakage. Each of these prior art devices has a number of disadvantages. Either, the particular design does not form a complete seal against the shaft to reliably foreclose leakage or it does not handle the difficulty inherent in leakage by the second, redundant stuffing box. Expense and difficulty of repairability are coexistant disadvantages. Such devices often require substantial maintenance and sometimes cannot be readily fitted on to an existing stuffing box due to the configuration of the particular equipment in which that stuffing box is being used. Hydraulic equipment comes in a myriad of assorted sizes, shapes and related configurations. The problem is particularly acute with today's hydraulic systems in which the ram may have a diameter of six feet or greater. Such systems have bolt circles which vary greatly in configuration. Thus, although several different systems may have identical six foot diameter rams, a single oil collection device capable of being adapted to each system has heretofore not been available.

It is desirable therefore to provide a fluid collection and anti-pollution device for stuffing boxes which overcomes the disadvantages of the prior art. The present invention, as hereinafter defined, provides such an apparatus for fluid collection by utilizing a flexible sleeve positioned about the face of a shaft-cylinder assembly. The sleeve is adapted for effectively sealing and collecting fluid which may leak and/or surge past the conventional stuffing box seals of a variety of different hydraulic system designs. Thus, spillage may be controlled with an inexpensive, versatile device adapted for being retrofitted onto many diverse configurations of stuffing boxes.

SUMMARY OF THE INVENTION

The fluid collection device of the present invention is adapted for fitting about the interface of a cylinder and a reciprocating shaft, for the collection of fluid at a collection point. In one aspect, the invention comprises a generally cylindrical body of an elastomeric material having an axial passage formed therethrough for receiving the reciprocating shaft. The cylindrical body includes a sealing flange radially extending around one end of the body to form a fluid tight seal with the face of the cylinder. An inwardly extending elastomeric collar is formed within the cylindrical body for engaging the shaft in a circular wiping fashion to form a first annular fluid receiving chamber. The body also includes a circular open end spaced from the reciprocating shaft to form a second annular chamber. Means are provided for fluid communication between the first chamber and the second chamber whereby fluid which passes the wiping action of the collar is drained back into the first chamber. A drain line is also provided which leads from the first annular chamber to a fluid collection point. In this manner all fluid egressing from the interface of the cylinder and shaft is contained.

In another aspect, the invention includes a flexible fluid collection sleeve having an inwardly extending collar engaging the shaft for wiping engagement. The collar is spring biased radially inwardly toward the shaft to accomodate shaft movement. The radially extending sealing flange of the sleeve also includes a generally flat lower surface having generally circular serrations formed therein for facilitating sealing engagement between the face of the cylinder and the sleeve to prevent leakage therebetween. The sleeve further includes a rigid circular ring positioned against the upper surface of the radially extending flange.

In yet another embodiment the collection device includes a cylinder shaft assembly which is assembled with a plurality of structural bolts. The flexible sleeve includes a plurality of elongate clamps disposed about the ring. Each clamp has an aperture formed in a first end thereof for receiving the structural bolts of the cylinder. The other end of each clamp extends from the aperture to engage the upper surface of the circular ring to clamp the sealing flange to the face of the cylinder.

DESCRIPTION OF THE DRAWINGS

For a more complete understanding of the present invention for further objects and advantages thereof, reference may now be had to the following description taken in conjunction with the accompanying drawing in which.

DETAILED DESCRIPTION

Figure 1:
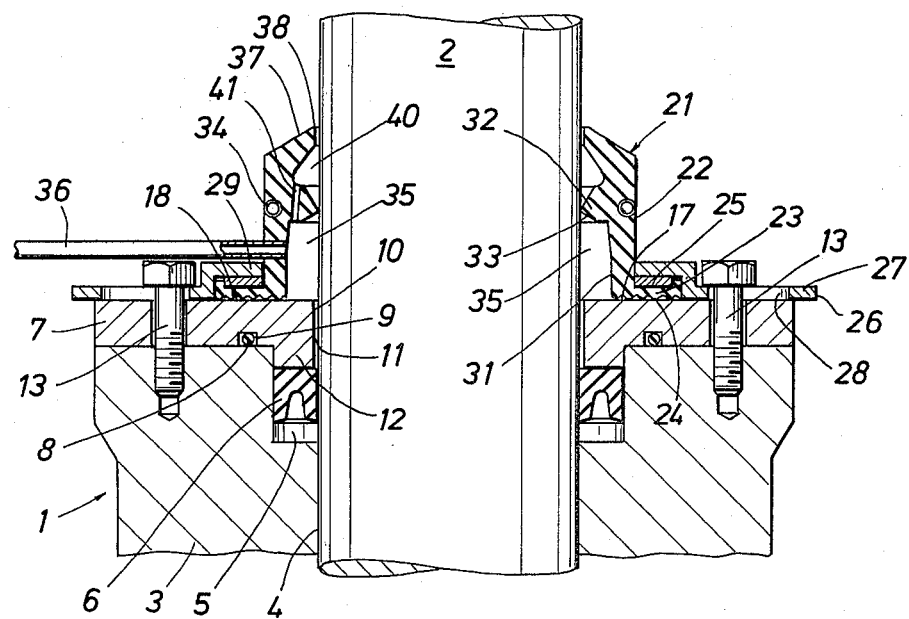
FIG. 1 is a side elevational cross-sectional of a stuffing box having the fluid collection device of the present invention mounted thereon.

Referring now to FIG. 1, there is shown a side elevational cross-sectional view of a conventional stuffing box 1 having a reciprocating shaft 2 passing therethrough. This stuffing box may be an integral part of various different pieces of industrial equipment such as hydraulic rams. Stuffing box 1 comprises the end portion of a hydraulic cylinder (not shown) of the type using high pressure hydraulic fluid to produce the reciprocation of the shaft 2 into and out of cylinder through the stuffing box 1. The function of the stuffing box 1 is, of course, to allow movement of the shaft 2 into and out of the cylinder while at the same time sealing the interface between the shaft and the cylinder to prevent leakage of the high pressure hydraulic fluid from within the cylinder into the environment. Such leakage results in a costly mess and a safety hazzard.

The conventional stuffing box 1 shown in FIG. 1 includes an end block 3 having a cylindrical opening 4 therein, for the interference free passage of the shaft 2 therethrough. Adjacent the cylindrical opening 4 is an enlarged cylindrical recess 5 which receives a cylindrical seal 6, e.g., a U-cup seal. The seal 6 circumferentially engages the sidewalls of the cylindrical shaft 2 for wiping engagement therewith and sealing of the hydraulic fluid within the cylinder.

Overlying the end of the block 3 is the makeup gland 7 having opposed, generally flat lower and upper surfaces. The lower surface includes an annular recess 8 which receives an O-ring 9 for sealing the surface between the gland 7 and block 3 against fluid leakage. The central portion of the gland 7 is provided with a circular aperture 10 having an inwardly facing, cylindrical surface of sufficient diameter for clearance around the reciprocating shaft 2 and the creation of an annular space 11. The inner portion of the gland 7 also includes a circular collar in the form of a lip 12 which extends into and seats within the recess 5. The lip 12 engages the upper surface of cylindrical seal 6 to hold it in position in recess 5. The gland 7 is held in position against the end of the block 3 by means of threaded bolts 13, spaced around the periphery, as shown most clearly in FIG. 2. As can be best visualized from FIG. 1, when the seal 6 begins to wear from repeated reciprocations of the shaft 2, leakage of the hydraulic fluid from within the cylinder to the outer surface of the shaft 2 is inevitable. Additionally, slight misalignment of the axis of the shaft 2 with respect to the axis of the cylinder and the stuffing box 1, contribute to leakage between the outer surface of the shaft 2 and the cylindrical seal 6. Preventing such leakage into the environment is one object of the present invention.

Still referring to FIG. 1, there is shown one embodiment of the present invention which may be seen to include a generally cylindrical elastomeric fluid collection sleeve shown generally as 21 having a cylindrical outerwall portion 22 and a radially extending flange portion 23. The lower surface 24 of the flange 23 is formed with circular serrations 17 extending therearound for engagement within the flat upper surface 18 of the gland 7. The serrations 17 provide a plurality of pressure points to assure sealing. Overlying the flange 23 is a cylindrical clamp ring 25 which is secured in a circular groove formed in the upper surface of the flange 23. A plurality of clamps 26 include a flat gland engaging portion 27 having a hole 28 therein for receiving the bolt 13. An offset, circular flange engaging portion 29 abuts the upper surface of the clamp ring 25 and forces a tight engagement between the serrated lower surface 24 of the flange 23 and the flat upper surface 18 of the gland 7 to prevent leakage of fluid therebetween.

The sleeve 21 also includes a first cylindrical inner surface 31 disposed adjacent a radially inwardly extending collar or ridge 32. A tapered inner edge 33 of the circular ridge 32 is thus in wiping engagement with the outer walls of the shaft 2 reciprocating through the stuffing box 1. The edge 33 is urged toward wiping engagement with the shaft 2 by means of an outer spring 34 sized and positioned to apply a uniform radially inwardly directed force against the ridge 32. The assembly provides a tight, uniformly resilient sliding engagement between the edge 33 and the shaft 2. As can best be seen from FIG. 1, the cylindrical inner wall 31 of the sleeve 21, in combination with the inner surface of ridge 32, a portion of upper gland surface and the outer cylindrical wall of the shaft 2 forms a first annular fluid collection chamber 35. The enclosed chamber 35 thus serves as a reservoir to contain any fluids which may have leaked past seal 6 of the stuffing box. The chamber 35 is connected to a hydraulic fluid return conduit 36. In this manner, all "leaked" fluid is collected for subsequent use or disposal.

The outer portion of the fluid collection device 21 includes an upper tapering surface forming a generally conical nose 37 with a circular end 38. The nose 37 tends to remove any foreign matter which may have been on, or protruding from, the edge of the shaft as it is moved back into the cylinder away from the stuffing box to prevent abrasion of the stuffing box seals. The circular end 38 is spaced slightly away from the shaft 2 wherein fluid is not squeezed or wiped thereby. A second fluid receiving chamber 40 is defined adjacent the circular end 38. The second chamber 40 is formed by the outer surface of ridge 32, the inside walls of the nose region 37 and the sidewalls of the shaft 2. Thus, if any fluid escapes past the first chamber 35 and the edge 33 when the shaft 2 moves outwardly that fluid is collected in the second chamber 40 by virtue of the wiping engagement between the edge 33 and the shaft 2 when the shaft 2 moves inwardly. The second chamber 40 is also in fluid communication with the first chamber 35 by means of longitudinally extending drain holes 41. Thus, fluid flows through drain holes 41 back into the first chamber 35 and thence to the reservoir by means of drain line 36.

It should be noted that the non-metallic, flexible fluid collection sleeve 21 of the present invention may be made from various materials including thermoplastic or thermosetting elastomeric or resinous materials such as polyesters, fluoroplastics, silicone, chloroprene, acrylics and the like. The term "flexible" as used herein, is intended to include both relatively soft or relatively hard materials, depending on the type of service to which the sleeve is subjected. Thus, the sleeve can be a homogenous substance, e.g., a rubber, or a hetergenous substance, e.g., a fluid rubber. It is only necessary that at least the edge 33 of the sleeve be sufficiently flexible to affect a caping action on the ram. The adjustable clamps 26 and the circular sealing ring 25 may be made from various metals or from other rigid materials such as phenolics, epoxies or the like.

Figure 2:
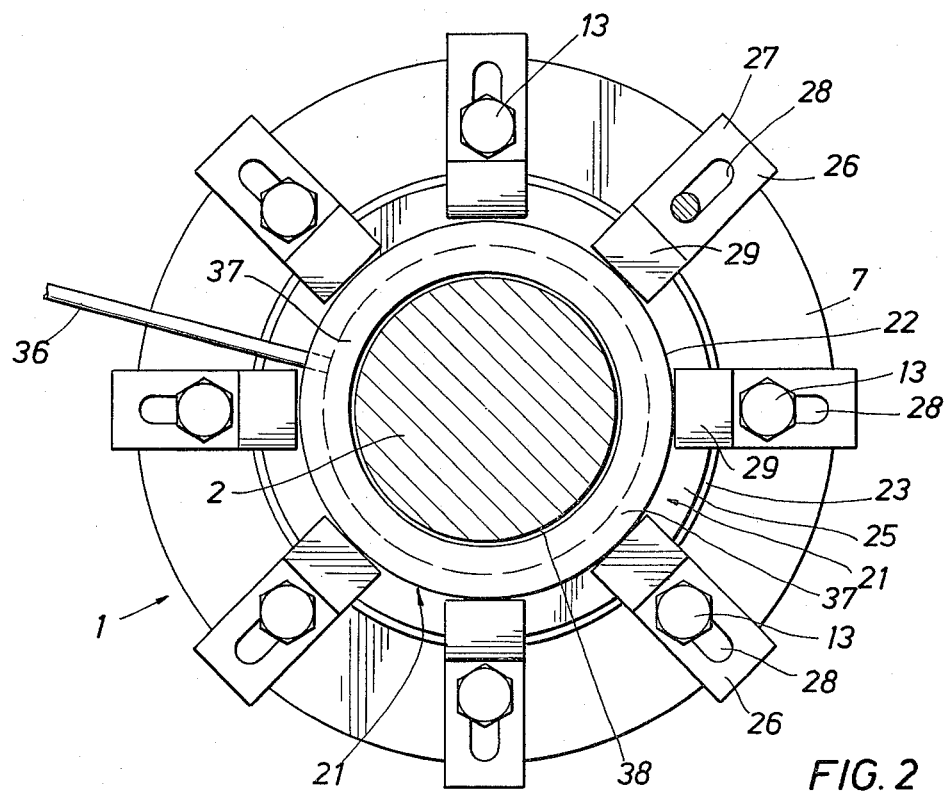
FIG. 2 is a top plan view of the stuffing box shown in FIG. 1, with the fluid collection device of the invention mounted thereon.

Referring now to FIG. 2, there is shown a top plan view of the stuffing box 1 shown in cross-section in FIG. 1, having the fluid collection sleeve 21 of the present invention affixed thereto. It can be particularly seen how the general cylindrical shape of the sleeve 21 conforms to the junction between the stuffing box 1 and the reciprocating shaft 2. The clamps 26 extend radially outwardly and are spaced circumferentially from one another about the periphery of the point of engagement between the flange 23 of the device 21 and the upper surface of the gland 7. The flat portion 27 of the clamps 26 may be seen to include an elongate opening 28 for receiving the shank of the bolt 13. The generally offset tab portion 29 of clamp 25 is shown to engage the upper surface of the circular ring 25. Tightening the bolts 13 pulls the circular ring 25 down upon the upper surface of the elastomeric, radial flange 23 to bring the serrations 17 of surface 24 into tight sealing engagement with the upper surface 18 of the gland 7, to prevent leakage of fluid therebetween.

It should be noted that the oil collection device of the present invention is adaptable to various makes of equipment. The device 21 can generally accomodate various sizes of rams or moveable shafts regardless of the make of the particular equipment. Such a characteristic of universal adaptability is desirable as far as the stocking and distribution of the component to serve on any piece of equipment manifesting the above defined problems of fluid leakage. It should also be noted that the adjustable clamps 26 may be made in various configurations so that they fit substantially all sizes of bolts and bolt circles, as will be shown in more detail below.

Referring to FIGS. 1 and 2, it may be seen that the circular spring 34 embedded within device 21 assures that there is wiping engagement between the outer surface of the shaft 2 and the inner surface 33 of the ridge 32. This engagement is assured even if shaft misalignment occurs.

In operation, any fluid which leaks through the stuffing box 1 must pass from between the seal 6 and the sidewalls of the shaft 2. Such fluid leakage in the present invention will pass freely through the open space 11 between the gland 7 and the shaft 2 for collection in the first chamber 35. Fluid collected within the chamber 35 will normally be vented back to the supply by means of drain connection 36. It may be seen that in the event of rupture or deterioration of the seal 6 in the stuffing box 1 excessive leakage can be contained by the collection device 21 of the present invention. Likewise leakage due to fluid pressure surges, often caused by high pressure surges within the hydraulic system, will also be effectively contained. Secondary leakage past the wiping engagement of the edge 33 of the ridge 32 will be collected within the second chamber 40. Such secondary fluid collection will thereafter be drained back into the first reservoir 35 through the fluid openings. A plurality of circumferentially spaced holes 41 are preferably employed through the ridge 32. Additionally, a plurality of drain lines 36 may be circumferentially spaced around surface 22 to communicate with the first reservoir 35 to ensure rapid drainage thereof.

Figure 3:
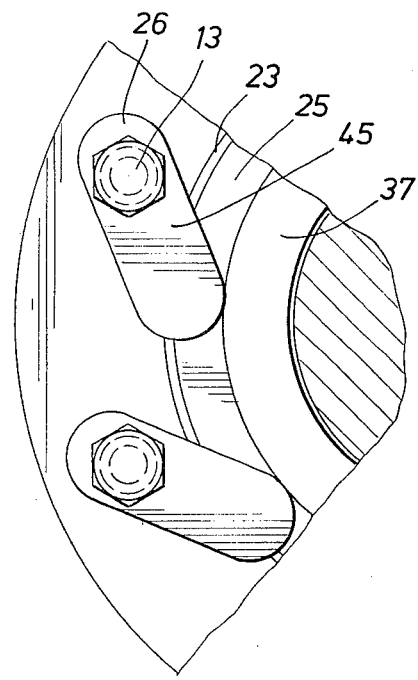
FIGS. 3 & 4 show, respectively, a fragmentary top plan view and a fragmentary side elevational cross-sectional view of a stuffing box having the fluid collection device of the invention mounted thereon, illustrating one embodiment of the clamp means used to mount the device.
Figure 4:
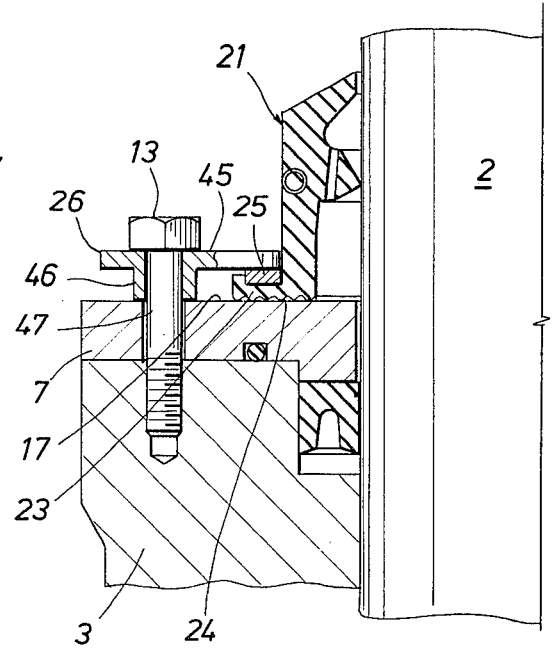

Referring now to FIGS. 3 & 4, we see an additional embodiment of a universal means for mounting the collection device of the present invention on various sizes and configuration of hydraulic cylinders. As can be seen, the clamp 26 comprises a planar upper portion 45 having a depending cylindrical neck portion 46 surrounding a bolt hole 47 formed therethrough. The length of the neck 46 is selected to provide the desired pressure of engagement between the inner most end of the flange 45 and the circular ring 25. This pressure provides the requiste sealing engagement between the lower serrated edges 24 of the radially extending flange portion 23 of the device 21 and the upper surface 17 of the gland 7. As can be seen from FIGS. 3 & 4, the flanges 26 are adjustable to cover various possible spacings of bolt holes 28 for the bolts 13 holding the makeup gland plate 7 at the end of the stuffing box 1. Because of various sizes and bolt configurations of hydraulic cylinders, the assembly bolts of different manufacturers may be spaced varying radial distances from the shaft 2. The advantagous configuration of the elongate body 46 of clamp 26 allows the clamp to be rotated about the bolt 13 to accommodate various sizes of cylinders and rams and arrangements of bolt holes securing the stuffing box to the cylinder.

Figure 5:
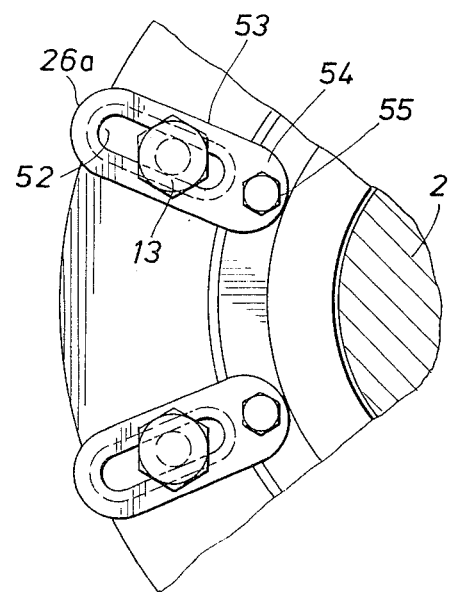
FIGS. 5 & 6 show, respectively, a fragmentary top-plan view and a fragmentary side elevational cross-sectional view of a stuffing box having the fluid collection device of the present invention mounted thereon, illustrating another embodiment of a clamp means for attaching the device to the stuffing box.
Figure 6:
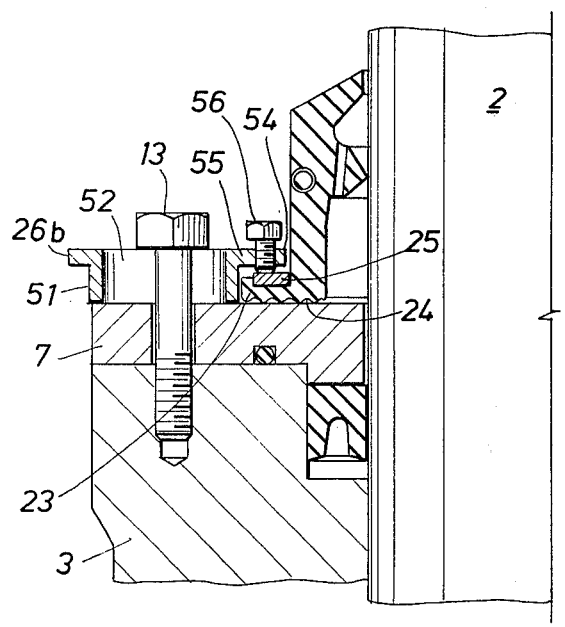

Referring now to FIGS. 5 & 6, there is shown an alternate embodiment of a means for providing adjustability for various sizes and types of hydraulic cylinders and the bolt hole arrangements therein. In the embodiment of FIGS. 5 & 6, it can be seen that the clamp 26a also includes a depending neck portion 51 which includes a longitudinally extending slot 52 formed therein. The slot 52 is constructed slightly narrower than the width of the bolt head to permit sliding movement of the bolt 13 within the slot 52. The inward region of the body portion 53 of the flange 26 includes a flat region 54 having a threaded aperture 55 therein to receive an adjustment bolt 56. The lower end of the adjustment bolt 56 is positioned to contact the upper surface of the circular clamping ring 25. This assembly configuration provides a wide degree of adjustment as to the force of engagement of the serrated lower surface 24 of the elastomeric flange 23 and the gland 7. As can be seen in FIG. 5, the slotted clamp 26b also permits adjustment for various radial spacings of the bolts 13 holding the makeup gland 7 to the end of the stuffing box 1. Thus, collection sleeve 21 of the present invention may be seen to be adjustable to fit many various configurations of spacings on various pieces of equipment.

It may also be seen that the present invention has multiple applications. For example, the squeeze and wiping action of the sleeve 21 against the reciprocating ram 2 may be utilized without stuffing box arrangements. For example, a fluid collection sleeve of the present invention might be used to seal a shaft rotating within a bearing journal from leakage. Moreover, the primary oil receiving chamber 35, and the secondary chamber 40 provide safety baffles in the event of seal rupture for any cylinder-ram combination. Such safety baffles would prevent the spraying of fluid into the surrounding area and over adjacent equipment and personnel in the event of rupture.

It is thus believed that the operation and construction of the above described invention will be apparent from the foregoing description. While the fluid control device and method of operation and assembly thereof shown and described have been characterized as being preferred, it will be obvious that various changes and modifications may be made therein without departing from the spirit and scope of the invention as defined in the following claims.

What is claimed is:

1. In a cylinder-moving shaft combination wherein at least a portion of said shaft protrudes from said cylinder, said apparatus further having a stuffing box assembly for sealing around said shaft, the improvement comprising a fluid collection device for fitting about said portion of said moving shaft protruding from said cylinder for the collection of fluid at a collection point, said device comprising:
    a generally cylindrical body of a flexible material having an axial passage formed therethrough for receiving said moving shaft, said cylindrical body including (a) a sealing flange extending radially outwardly from one end of said body to form a fluid-tight seal with a portion of said stuffing box assembly, (b) an inwardly extending elastomeric collar formed within said cylindrical body for engaging the shaft in a circular wiping fashion to form a first annular fluid receiving space, (c) a circular open end spaced from the moving shaft to form a second annular fluid receiving space, and (d) means providing open fluid communication between said first annular space and said second annular space whereby fluid which passes the wiping action of said collar is drained back into said first annular space; and
    a drain line leading from said first annular space.

2. A fluid collection device as set out in claim 1 wherein said inwardly extending elastomeric collar wipingly engaging said shaft for wiping engagement is spring biased radially inwardly.

3. A fluid collection device as set forth in claim 2 wherein said radially extending sealing flange includes a generally flat lower surface having generally circular serrations formed therein for facilitating and providing good sealing engagement between said portion of said stuffing box assembly and the device to prevent leakage therebetween.

4. A fluid oil collection device as set forth in claim 3 wherein said device further includes a rigid circular ring positioned against the upper surface of said radially extending flange.

5. A fluid collection device as set out in claim 4 wherein said cylinder is assembled with a plurality of structural bolts and wherein said device includes a plurality of elongate clamps disposed about said ring said clamps having an aperture formed in a first end thereof for receiving said bolts of said cylinder, and wherein a second end of said clamp extends from said aperture to engage the upper surface of said circular ring for clamping said sealing flange to said stuffing box assembly.

6. A fluid collection device as set forth in claim 5 wherein said apertures formed in said clamps include elongated slots for providing adjustability of the position of the clamp relative to the cylinder bolts.

7. A fluid collection device as set forth in claim 6 wherein the ring engaging end of said clamps includes a threaded aperture and an adjustment bolt threadly engaged therewith to permit adjustment between said clamp and said circular ring and the seal between said clamp and said cylinder.

8. A fluid collection device for attachment to a stuffing box assembly of a cylinder and shaft combination, for collecting and delivering fluid to a fluid supply source, said collection device comprising:
    a sleeve formed of a flexible material and having first and second ends and inner and outer walls with an opening at each end for passage of the shaft therethrough, said second end having an opening larger than the diameter of said shaft;
    means for sealing said first end of said sleeve to a portion of said stuffing box assembly;
    an inwardly facing collar formed intermediate the first and second ends of said sleeve along the inner walls thereof, said collar forming a wiping edge in biased engagement with said shaft to prevent the passage of fluids thereby;
    a first fluid receiving reservoir formed within said sleeve and defined by the inner walls of said sleeve, said radially inwardly facing collar, the walls of said shaft, and said portion of said stuffing box assembly;
    a second fluid receiving reservoir formed between said second end of said sleeve and said collar;
    means providing open fluid communication for draining of fluid from said second reservoir to said first reservoir; and
    means for venting said reservoir to said fluid supply source.

9. A fluid collection device as set forth in claim 8 wherein the engagement between said inwardly facing collar and said shaft is inwardly biased by a circular spring secured around said sleeve and said collar therewithin.

10. A fluid collection device as set forth within claim 8 wherein said means for sealing said sleeve to said stuffing box assembly includes a generally circular radially extending elastomeric flange formed integral with said first end of said sleeve, and means for securing a tight engagement between the bottom surface of said flange and said portion of said stuffing box assembly.

11. A fluid collection device as set forth in claim 10 wherein said sealing means comprises a circular ring disposed upon said radially extending flange for urging said ring and said underlying flange toward said flange of said stuffing box assembly to ensure fluid tight engagement therewith.

12. A fluid collection device as set forth in claim 11 wherein said urging means includes a plurality of elongate clamps, each having an aperture formed in a first end thereof for receiving a bolt therethrough and a ring engaging portion comprising a second end for urging said ring against said flange.

13. A fluid collection device as set forth in claim 12 wherein said bolt receiving aperture in said clamp includes an elongate slot.

14. A fluid collection device as set forth in claim 13 wherein said clamp also includes a threaded aperture formed in said second end and an adjustment bolt received therein for adjusting the pressure engagement between said ring and said flange.

15. A fluid collection device claim as set forth in claim 14 wherein a lower surface of said flange includes a plurality of circular serrations for engagement with said portion of said stuffing box.

16. A fluid collection device for a fluid actuated piston-cylinder assembly having a cylinder face into which a piston shaft is reciprocally mounted, said device being adapted for collecting fluid egressing from said cylinder face and comprising:

a generally cylindrical sleeve formed of a flexible material disposed upon the face of said cylinder and around said shaft, said sleeve including an upper cylindrical body with first and second ends and having an axial passage formed therethrough for receiving said shaft therein, and a lower sealing flange for engaging said face of said cylinder, said first end being distal said sealing flanges and providing an opening for said shaft which is larger than the diameter of said shaft;

said cylindrical body including first and second fluid collection chambers formed therein and separated by an inwardly extending collar disposed about said shaft in interfering, wiping engagement therewith said first chamber formed between said first end and said collar;

means for securing said lower sealing flange of said sleeve to said cylinder face; and means providing open fluid communication from said first to said second chambers to a fluid collection reservoir.

* * * * *